(12) United States Patent
Bülow et al.

(10) Patent No.: US 7,289,739 B2
(45) Date of Patent: Oct. 30, 2007

(54) POLARIZATION MODE DISPERSION CONTROLLER DEVICE AND METHOD FOR ITS OPERATION

(75) Inventors: Henning Bülow, Kornwestheim (DE); Fred Buchali, Waiblingen (DE)

(73) Assignee: Alcatel, Paris (FR)

( * ) Notice: Subject to any disclaimer, the term of this patent is extended or adjusted under 35 U.S.C. 154(b) by 671 days.

(21) Appl. No.: 10/715,557

(22) Filed: Nov. 19, 2003

(65) Prior Publication Data
US 2004/0105683 A1    Jun. 3, 2004

(30) Foreign Application Priority Data
Dec. 3, 2002    (EP)    ........................ 02360332

(51) Int. Cl.
*H04B 10/12*    (2006.01)
(52) U.S. Cl. .................. 398/147; 398/158; 398/149
(58) Field of Classification Search ................ 398/147, 398/81, 158, 159, 205, 208, 149
See application file for complete search history.

(56) References Cited

U.S. PATENT DOCUMENTS

| 6,538,787 | B1 * | 3/2003 | Moeller et al. ............. 398/158 |
| 6,826,331 | B2 * | 11/2004 | Barwicz et al. ............. 385/37 |
| 7,003,183 | B1 * | 2/2006 | Phua et al. .................... 385/11 |
| 7,020,398 | B2 * | 3/2006 | Takiguchi et al. ........... 398/158 |
| 7,062,123 | B2 * | 6/2006 | DeBaun et al. .............. 385/27 |
| 7,067,795 | B1 * | 6/2006 | Yan et al. ..................... 250/225 |
| 2001/0048798 | A1 * | 12/2001 | Sasaoka et al. ............. 385/123 |
| 2002/0018266 | A1 * | 2/2002 | Ooi et al. .................... 359/161 |
| 2002/0018267 | A1 * | 2/2002 | Sun et al. .................... 359/161 |
| 2002/0060760 | A1 * | 5/2002 | Weiner ........................ 349/96 |
| 2002/0177912 | A1 * | 11/2002 | Sobiski ........................ 700/33 |
| 2003/0053174 | A1 * | 3/2003 | Rosenfeldt .................. 359/161 |
| 2003/0072513 | A1 * | 4/2003 | Glingener et al. ........... 385/11 |
| 2003/0123884 | A1 * | 7/2003 | Wilner et al. ................ 398/212 |
| 2003/0202795 | A1 * | 10/2003 | Garcia et al. ................ 398/147 |

FOREIGN PATENT DOCUMENTS

EP    1 239 613 A1    9/2002

OTHER PUBLICATIONS

"Self-Stabilzing Continuously Tunable Group Delay Line for PMD Compensation". Henning, Bulow. 2002. IEEExploer.com.*

(Continued)

*Primary Examiner*—Kenneth Vanderpuye
*Assistant Examiner*—Thi Q. Le
(74) *Attorney, Agent, or Firm*—Sughrue Mion Pllc.

(57) ABSTRACT

A polarization mode dispersion (PMD) controller device for controlling the state of polarization of an optical light wave comprising a dispersion compensation unit (2; 25; 40) and an adaptation control unit (6; 28; 44), wherein the dispersion compensation unit (2; 25; 40) comprises a multitude of compensation stages processing the optical light wave, and wherein the adaptation control unit (6; 28; 44) controls the dispersion compensation unit (2; 25; 40) is characterized in that at least one feed-forward signal tap (4; 26a-26c, 73a-73c) is provided tapping the optical light wave inserted into one of the compensation stages, that the feed-forward signal (s) is(are) fed into a distortion analyzer unit (5; 27; 66) and that the distortion analyzer unit (5; 27; 66) provides the adaptation control unit (6; 28; 44) with information about the incoming optical light wave. It accelerates the adaptation speed and lowers the costs of a high-speed PMD controller device.

15 Claims, 4 Drawing Sheets

OTHER PUBLICATIONS

"Polarization Mode Dispersion Compensation by Phase Diversity Detection". B. W. Hakki. Jan. 1997, IEEE Photonic Technology Letters.*

U.S. Appl. No. 10/626,597, filed Nov. 19, 2003.

L-S. Yan et al, "Differential Group Delay Monitoring Used as Feedforward Information for Polarization Mode Dispersoin Compensation", IEEE Technology Letters, vol. 14, No. 10, Oct. 2002, pp. 1463-1465, XP00114730.

P.C. Chou et al, "Demonstration of a Feed-Forward PMD Compensation Technique", IEEE Photonics Technology Letters, IEEE, Inc. New York, US, vol. 14, No. 2, Feb. 2002, pp. 1761-1163, XP001123176.

H. Rosenfeldt et al, "Feed-forward approach for automatic PMD compensation at 80 Gbit/s over 45 km installed single mode fiber" Optical Fibre Conference, vol. 6, Sep. 30, 2001, pp. 68-69, XP010582880.

* cited by examiner

POLARIZATION MODE DISPERSION CONTROLLER DEVICE AND METHOD FOR ITS OPERATION

BACKGROUND OF THE INVENTION

The invention is based on a priority application EP 02 360 332.7 which is hereby incorporated by reference.

The invention relates to a polarization mode dispersion (PMD) controller device for controlling the state of polarization of an optical light wave, in particular in a terabit optical network, comprising a dispersion compensation unit and an adaptation control unit, wherein the dispersion compensation unit is fed with an incoming optical light wave, wherein the dispersion compensation unit comprises a multitude of compensation stages processing the optical light wave, wherein the dispersion compensation unit provides an equalized optical light wave, and wherein the adaptation control unit controls the dispersion compensation unit.

A device of this kind has been disclosed in F. Buchali et al., OFC 2002, Anaheim (Calif.), Proc. WE6.

For transporting information, in particular digital information, in large amounts and over long distances, optical information networks can be applied. The information to be transported is modulated onto optical signals such as light waves, and the modulated light waves are sent through an optical waveguide. The length of such a waveguide may be on the order of tens or even hundreds of kilometers.

When travelling through an optical waveguide, such as a glass fiber, the light wave changes its properties. In particular, the polarization of the optical light wave drifts during propagation, in particular as a function of frequency. The degree of polarization drift is varying over time, e.g. because of a changing temperature of the waveguide. This might lead to changing temporal broadening of the modulated bit pulses which results in a degradation of the detected signal, i.e. in a degraded bit error ratio. In order to recover the information carried by the optical light wave, the light wave is processed in a polarization mode dispersion (PMD) controller device which compensates for the polarization drift. Only after this processing, the equalized optical light wave can be fed into a detector device for recovering the information.

PMD controller devices of the state of the art comprise a dispersion compensation unit, a feedback signal tap and an adaptation control unit. The incoming optical light wave is fed into the dispersion compensation unit, is processed applying a multitude of tunable compensation units, typically comprising phase shifters, and exits the dispersion compensation unit as an altered optical light wave. The altered signal is tapped with the feedback signal tap and analyzed in the adaptation control unit (or in a separate feedback signal analyzer connected to the adaptation control unit). The adaptation control unit controls the tunable phase shifters. In order to optimize the altered signal, the control parameter of each phase shifter is dithered, and depending on the change of the quality of the feedback signal, the control parameter is adapted correspondingly.

SUMMARY OF THE INVENTION

This type of arrangement and the underlying method of operation have a number of disadvantages. Above all, the number of control parameters is equal to the number of tuning parameters of the compensation units. In order to be able to continuously compensate for any polarization drift, a minimum of 4 phase shifters are necessary, resulting in 4 dithering parameters. The more dithering parameters, the faster must be the analysis of the feedback signal and the adaptation of the compensation unit in order to get acceptably short adaptation times for quick information transfer, in particular in terabit optical networks. However, the required high-speed optoelectronic elements generally mean higher costs. Moreover, dithering of such a large number of parameters bears the risk of getting trapped in a local quality optimum of the feedback signal, thus obtaining only an incompletely equalized optical light wave.

In order to soothe these problems, it has been proposed to scramble the optical light wave before transmission. The polarization scrambling imprints some special properties onto the optical light wave. With these special properties known, the equalization procedure can be simplified, see H. Rosenfeldt et al., OCF 2001, Anaheim (Calif.), Proc. PD27 1-3. However, the scrambling requires special equipment of the transmitter (sender) equipment as well as standardization and is therefore undesirable.

It is the object of the present invention to accelerate the adaptation of a dispersion compensation unit, and to lower the costs of a high-speed PMD controller device.

This object is achieved by a PMD controller device as mentioned in the beginning, characterized in that at least one feed-forward signal tap is provided tapping the optical light wave inserted into one of the compensation stages, that the feed-forward signal(s) tapped by the feed-forward signal tap(s) is(are) fed into a distortion analyzer unit, and that the distortion analyzer unit provides the adaptation control unit with information about the incoming optical light wave for setting the dispersion compensation unit.

The dispersion compensation unit is typically based on the idea of splitting the incoming optical light waves into different partial light waves, and to alter selected partial light waves, in particular by adding a phase shift with a tunable phase shifter, to recombine the partial light waves, and, to split again and so on. The dispersion compensation unit can be divided into a multitude of compensation stages. Each compensation stage performs a part of the processing of the optical light wave within the dispersion compensation unit. Preferably, each compensation stage comprises at maximum one tunable processing element such as a tunable phase shifter. With the correct tuning parameter(s) for each compensation stage, the incoming optical light wave is optimally equalized.

In the state of the art, the tuning parameters are determined with a feedback loop and a dithering procedure alone. In contrast, according to the invention, the determination of the optimum tuning parameters is supported by at least one feed-forward signal tap and a distortion analyzer. The feed-forward signal tap taps the optical light wave not after processing, but at an earlier point of time, in particular before the beginning of the processing or at an intermediate stage of processing. The distortion analyzer then determines properties of the optical light wave at that point of time, in particular polarization properties. This information is used to determine, or at least to help to determine, the optimum tuning parameters of the compensation stages of the dispersion compensation unit, in particular of those compensation stages following the feed-forward signal tap(s).

The more information can be gained about the optical light wave, and preferably about the incoming optical light wave, the more exact can be the determination of the tuning parameters. In accordance with the invention, the tuning parameters can be calculated on the basis of the information, but it is also possible to read out a table of tuning parameters saved for the current properties of the incoming optical light wave. This table can be obtained by experiments performed in advance.

The inventive PMD controller device can in principle be operated without a feedback loop, with no need for dithering, and a direct setting of the tuning parameters within one step. This is extremely fast, on the order of milliseconds. Alternatively, the number of dithering parameters can be reduced, so less dithering steps need to be performed. In the last case, this advantage can be used either to shorten the dithering time (adaptation time), or to use low-cost slow-speed equipment at a constant adaptation time. Without the need for any quick dithering, the tunable processing elements need not be suitable for high-speed operation. Also, photo diodes used for light detection at the feed-forward signal taps and/or the feed-back signal tap need not be able to follow quick dithering.

In a preferred embodiment of the inventive PMD controller device, only one feed-forward signal tap is provided tapping the incoming optical light wave inserted into the first compensation stage. This signal tap taps the incoming optical light wave before any processing. The distortion analyzer does not need any information about the current tuning parameters of the compensation stages in order to access all properties of the incoming optical light wave.

In an alternative and also preferred embodiment, a multitude of feed-forward signal taps is provided tapping the optical light wave as inserted at different compensation stages each. Thus, these signal taps tap the optical light wave at different stages of processing. With the prevailing tuning parameters (and tunable processing elements) known, information about the incoming, not yet processed optical light wave can be reconstructed. In this embodiment, the dispersion compensation unit can simultaneously be used for polarization analysis, i.e. the distortion analyzer unit is partially integrated into the dispersion compensation unit. Preferably, a number of four tunable processing elements and four intermediate signal taps are provided. These amounts suffice to equalize an optical light wave completely and continuously.

In a highly preferred embodiment of the inventive PMD controller device, the distortion analyzer unit determines the state of polarization (SOP) of the incoming optical light wave as a function of the frequency of the incoming optical light wave based on the feed-forward signal(s). The distortion analyzer, receiving the feed-forward signals, performs a frequency-dependent measurement of the state of polarization. This SOP can be described with two polarization parameters. The SOP information is fed into the adaptation control unit. With this information known, the adaptation control unit can determine the optimum tuning parameters of the compensation stages for this SOP, and can set the dispersion compensation unit accordingly.

A further embodiment of the inventive PMD controller device is characterized in that the distortion analyzer unit is suitable for analyzing a not polarization scrambled signal. For a non-scrambled signal, the PMD compensation is particularly difficult with a state of the art feedback loop. Therefore, the embodiment is particularly useful.

Further preferred is an embodiment, wherein at least one feed-forward signal tap comprises a wavelength demultiplexer unit, and that the distortion analyzer unit is fed with the demultiplexed signals provided by the wavelength demultiplexer unit(s). A wavelength demultiplexer unit allows a quick separation of the different frequency parts of the tapped optical signal. Thus, a frequency-dependent analysis of the SOP can be simplified. The demultiplexer unit allows the determination of the PMD of the fiber having transported the optical light wave. An alternative to wavelength demultiplexer units are scanning filters for the same purposes. They can be applied in accordance with the invention, too.

Another preferred embodiment of the inventive PMD controller device is characterized in that the dispersion compensation unit comprises a planar light wave circuit (=PLC) with a polarization splitter (=PBS) at the signal input of the PLC, a multitude of 3 dB couplers and preferably a polarization combiner (=PBC) at the signal output of the PLC, wherein these components of the PLC are connected in series, with each connection comprising a first waveguide and a second waveguide comprising a tunable phaseshifter. PLCs are inexpensive in production and require only a minimum of space. Feed-forward signal taps are preferably disposed immediately preceding the tunable phaseshifters and/or at the signal input of the dispersion compensation unit. The described design is particularly simple. Other PLC designs, e.g. omitting or adding tunable phaseshifters, adding delay elements or further branching are also possible. In accordance with the invention, the dispersion compensation unit and any signal taps are realized on a single PLC.

Another preferred embodiment is characterized in that the PMD controller device further comprises a feedback signal tap tapping the equalized optical light wave, and that the adaptation control unit is fed with the feedback signal provided by the feedback signal tap. In this case, an analysis of the unprocessed or preferably incompletely processed optical light wave as well as an analysis of the processed optical light wave can be performed at the same time. Both analysis results are used to find the optimum tuning parameters. This gives a broad variety of information to base the adaptation upon. This embodiment is particularly preferred in combination with one, two or three intermediate signal taps.

The invention is also realized in a method of operating a PMD controller device according the preceding embodiment, wherein the adaptation control unit dithers a number N of parameters smaller than the amount P of tuning parameters of tunable compensation stages in order to optimize the feedback signal. In other words, the adaptation control unit does not dither each tuning parameter (and thus each tunable processing element) independently. If the SOP of the incoming optical light wave as a function of frequency is known, two parameters suffice to tune the distortion compensation unit to a desired equalized SOP, and the dispersion compensation unit can be set directly, i.e. without any dithering, N=0. If there is no information about the SOP of the optical light wave, all tuning parameters must be dithered, i.e. N=P, with a minimum of four tuning parameters (corresponding to four tunable processing elements, four degrees of freedom) in order to be able to obtain continuous and complete polarization equalization. If there is some, but incomplete information about the SOP, then the number of dithering parameters can be reduced below the number of tuning parameters, i.e. 0<N<P. In the most convenient case, the incomplete information can be used to set one of the tuning parameters directly, and dithering is only necessary for the remaining tuning parameters. In general, however, the incomplete information will result in a system of cross-correlations between the tuning parameters, e.g. determining the optimum value of one tuning parameter as a function of the other ones. This means that the adaptation still may need to adjust all tuning parameters, but the dimension of the space of useful tuning parameter combinations (and thus the total amount of useful tuning parameter combinations to be dithered through) is reduced. This accelerates the adaptation procedure enormously. It is particularly preferred if the amount of adaptation parameters N is 2. Note that two adaptation parameters are necessary and sufficient to address an arbitrary SOP of the equalized optical light wave out of a known SOP of the incoming optical light wave.

Also in accordance with the invention is a method of operating an inventive PMD controller device as mentioned above, wherein the distortion analyzer unit determines the state of polarization (SOP) of the incoming optical light wave as a function of its frequency, and that the adaptation control unit uses the SOP information for controlling the compensation stages. If the complete SOP of the incoming light wave is known as a function of frequency, and if the properties of the PMD controller device itself (position of the phaseshifters, etc.) is known, then any SOP of the equalized optical light wave can be directly commanded by appropriate setting of the tuning parameters of the tunable processing elements in the tunable compensation stages. The optimum tuning parameters can be set directly in one step, without any time-consuming dithering. The adaptation therefore is very fast, on the order of milliseconds without requiring phase shifters with more than two orders of magnitude higher speeds which are mandatory when applying a dithering method which is based on consecutively changing of all phase shifters. The relaxed speed requirements for the phase shifters allows to use low-cost technologies. Furthermore, since the photo diodes used for signal detection have to measure average optical power levels and need not to analyze the signal at bit level, low-speed and low-cost monitor diodes can be used at the feed-forward signal taps. Finally, when setting the tuning parameters directly without dithering, there is no risk of getting trapped in a local optimum of the feedback signal that is not the absolute optimum.

Also preferred is a further development of the preceding method wherein the determination of operating conditions for the compensation stages (i.e. the tuning parameters) is accomplished by reading out a table and/or by calculation, in particular taking into account the experimental or numerical determined relation between signal distortion measured by the distortion analyzer unit and the setting of the dispersion compensation unit parameters (i.e. the tuning parameters) which is required to improve the signal quality at the dispersion compensation unit's output. The more exact the correlation between signal distortion caused by the input transport glass fiber, the tuning parameters and the equalized (output) signal is known, the more efficient will be the minimization of the PMD distortion. With the PMD of the fiber plus the measured signal polarization, the exact setting of the dispersion compensation unit can be calculated, which minimizes the PMD distortion (first and higher orders) of the output signal.

Another development of said method is characterized in that the operating conditions of the compensation stages are determined and adjusted continuously. This means rewinding directly for endless control of the PMD controller device is performed. At no time during the control, the optimum equalization needs to be left when directly setting the tuning parameters. If dithering was done, deliberate disturbances of the optimum conditions would be required for each new adaptation cycle.

The scope of the invention also comprises a computer program for performing the inventive method mentioned above or the first development of said method.

Further advantages can be extracted from the description and the enclosed drawings. The features mentioned above and below can be used in accordance with the invention either individually or collectively in any combination. The embodiments mentioned are not to be understood as exhaustive enumeration but rather have exemplary character for the description of the invention.

BRIEF DESCRIPTION OF THE DRAWINGS

The invention is described in further detail below and shown in the drawings.

Figure 1:
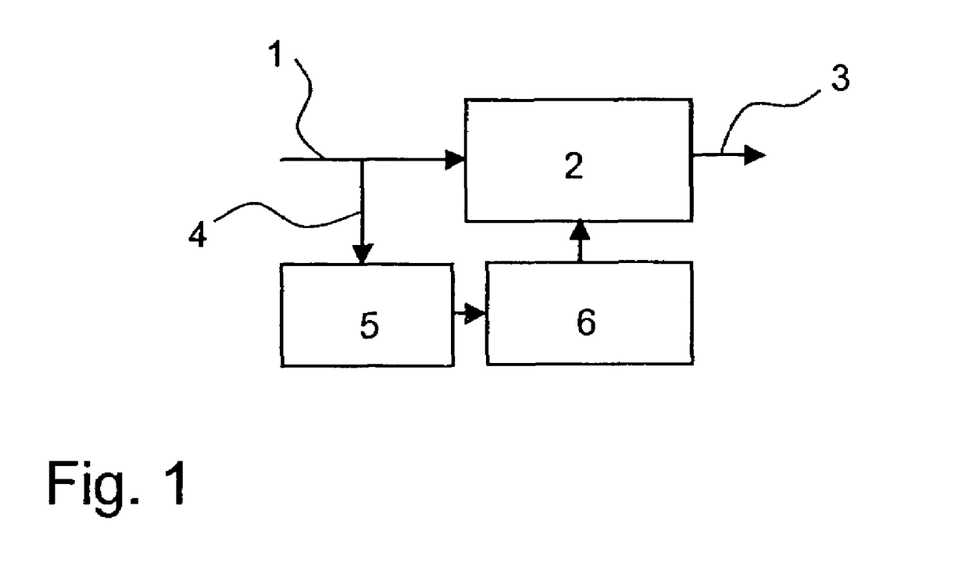
FIG. 1 shows a first embodiment of an inventive PMD controller device with a single feed-forward signal tap.

FIG. 1 shows an first embodiment of an inventive PMD controller device. An input waveguide 1, transporting an incoming optical light wave, runs into a dispersion compensation unit 2. Within the dispersion compensation unit 2, the optical light wave is processed by a multitude of compensation stages (not shown). Four of the compensation stages comprise a tunable thermooptic phaseshifter as tunable processing element. After processing, the equalized optical light wave exits the dispersion compensation unit 2 through the exit wave guide 3.

The incoming optical waveguide 1 is tapped by a feed-forward signal tap 4. Thus, a fraction of the incoming optical light wave is fed into a distortion analyzer unit 5. The distortion analyzer unit 5 comprises means for analyzing the state of polarization of the tapped feed-forward signal as a function of frequency. Information about this state of polarization is continuously fed into an adaptation control device 6. The adaptation control device 6 controls the tunable phaseshifters of the dispersion compensation unit 2 which constitute the tunable compensation stages of the dispersion compensation unit 2. The adaptation control unit 6 has also information stored about the correlation between SOP of the incoming optical light wave, the tuning parameters of the tunable compensation stages, and the SOP of the equalized (outgoing) optical light wave. In order to obtain a desired, fixed SOP of the equalized optical light wave, the incoming optical light wave with the determined SOP must undergo an appropriate type of processing in the dispersion compensation unit 2, as represented by the corresponding tuning parameters of the tunable compensation stages. The adaptation control unit 6 directly sets the tuning parameters accordingly and continuously. Thus, endless control is achieved without a feedback loop and time-consuming dithering.

Figure 2:
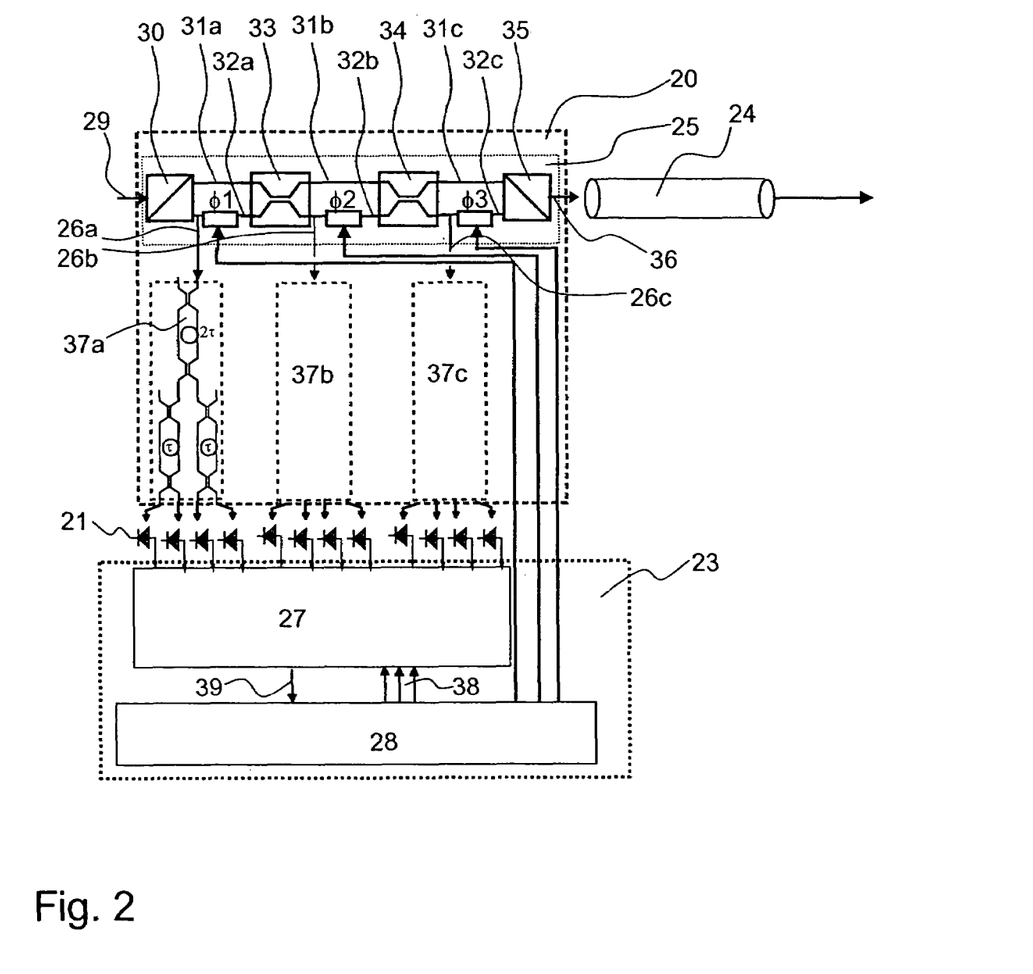
FIG. 2 shows a second embodiment of an inventive PMD controller device with three feed-forward signal taps tapping the optical light wave at different stages of processing.

FIG. 2 shows a second embodiment of the inventive PMD controller device. It basically consists of a planar light wave circuit (PLC) 20, a set of photo diodes 21 attached to it, an electronic control processor 23, and a polarization mode fiber (PMF) 24. The PLC 20 comprises a dispersion compensation unit 25 and three feed-forward signal taps 26a-26c. The electronic control processor 23 comprises a distortion analyzer unit 27 and an adaptation control unit 28.

An incoming optical light wave enters the PMD controller device shown in FIG. 2 through an input waveguide 29. It is then split into two branches within a polarization splitter (PBS) 30. The split parts propagate in first and second waveguides 31a, 32a. The second waveguide 32a contains a feed-forward signal tap 26a and a tunable phaseshifter $\phi 1$. Both waveguides 31a, 32a then run into a 3 dB coupler 33. Two further, similar waveguides 31b, 32b with feed-forward signal tap 26b and phaseshifter $\phi 2$ leave the 3 dB coupler 33 and run into a further 3 dB coupler 34. Another two similar waveguides 31c, 32c with feed-forward signal tap 26c and phaseshifter $\phi 3$ leave the 3 dB coupler 34 and run into a polarization combiner (PBC) 35. The exit waveguide 36 of the PBC 35 feeds the equalized optical light wave into the PMF 24. The PBS 30, the 3 dB couplers 33, 34, the PBC 35 and the tunable phaseshifters $\phi 1, \phi 2, \phi 3$ (with their respective waveguides) can be considered as compensation stages of the dispersion compensation unit 25. Only the phaseshifters $\phi 1, \phi 2, \phi 3$ are tunable compensation stages; the others are passive compensation stages.

If an optical light wave runs through the dispersion compensation unit 25, the partially processed optical light wave is tapped at three positions with the feed-forward signal taps 26a-26c. In the embodiment shown, each feed-forward signal tap 26a-26c comprises a wavelength demultiplexer unit 37a-37c, splitting the respective tapped optical signal into four branches. In each branch, a different fraction of the frequency spectrum of the tapped optical signal is dominant. This is achieved by a combination of known delay elements and 3 dB couplers, e.g. Each branch runs into a separate photo diode of the set of photodiodes 21 in order to measure the intensity (average optical power) of that branch. The distortion analyzer unit 27, receiving the signals of the photodiodes and receiving data about the current setting of the tunable phase shifters $\phi 1, \phi 2, \phi 3$ via signal lines 38, then calculates the current state of polarization of the incoming optical light wave as a function of frequency (or of the wavelength). This SOP information is then messaged to the adaptation control unit 28 via signal line 39.

The adaptation control unit 28 determines the optimum setting of tuning parameters of the tunable phaseshifters $\phi 1, \phi 2, \phi 3$ for the prevailing state of polarization of the incoming optical light wave for obtaining an equalized optical light wave at the exit waveguide with a desired (fixed) SOP. This determination can be a calculation and/or may involve reading out a table. Subsequently, the adaptation control unit 28 sends control signals to the tunable phase shifters $\phi 1, \phi 2, \phi 3$, making them assume the determined tuning parameters.

The determination of the SOP of the incoming optical light wave and of the tuning parameters of the optimum setting as well as the controlling of the tunable phase shifters $\phi 1, \phi 2, \phi 3$ are preformed continuously.

Figure 3:
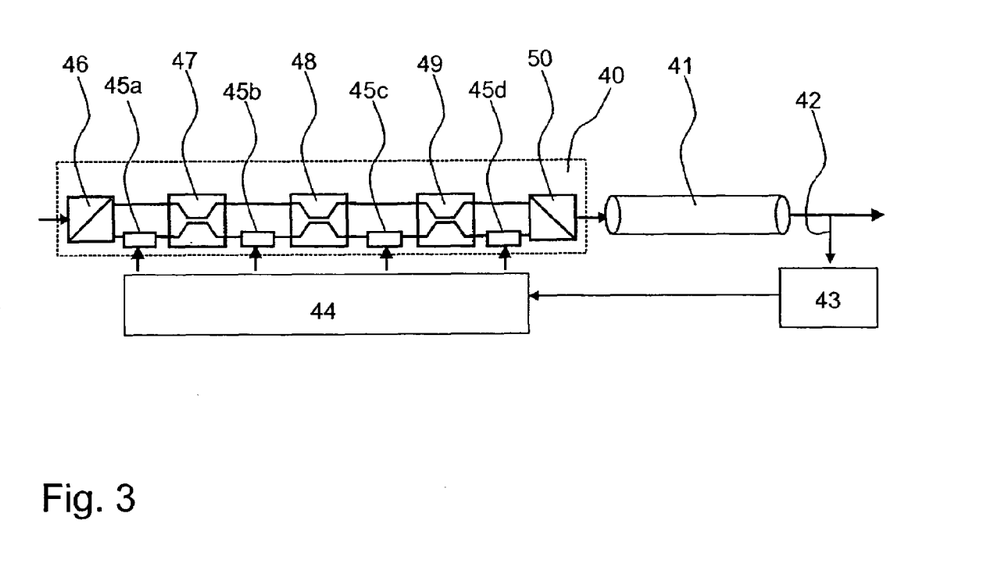
FIG. 3 shows a state of the art PMD controller device with a feedback loop.

A PMD controller device of the state of the art is shown in FIG. 3. It comprises a dispersion compensation unit 40 disposed on a PLC, a PMF 41, a feedback signal tap 42 with a feedback signal analyzer 43 and an adaptation control unit 44. The dispersion compensation unit 40 comprises four tunable phaseshifters 45a-45d in a cascade of a PBS 46, three 3 dB couplers 47, 48, 49, and a PBC 50.

For adapting the dispersion compensation unit 40, the adaptation control unit 44 consecutively dithers the phase shifts of the tunable phase shifters 45a-45d. After each dithering step, the feedback signal must be analyzed in the feedback analyzer 43, and the adaptation control unit 44 either accepts the dithering change if the feedback signal quality has improved, or rejects the dithering change if the feedback signal quality has deteriorated. However, since there are four dithering parameters, there is the risk of not finding the optimum feedback signal quality because of getting trapped in a local quality maximum. In order to avoid this completely, one would have to scan through the complete, four-dimensional tuning parameter space, what takes either too long for a useful adaptation, or which requires expensive, high-speed photo detectors and tuning electrodes.

Note that other realizations of a PMD compensator device might comprise fiber-based elements like fiber squeezer polarization controllers and polarization maintaining fibers (PMF), or integrated-optic (IO) realizations like the already mentioned PLC approach based on thermo-optic tunable phase shifters. But also other IO technologies might serve as realization platform like planar polymer waveguides with thermo-optic or electro-optic tuning elements, Lithium-Niobate technology with electro-optic phase shifters or micro-optic realization (MOEMS) working with movable mirrors as phase shifters.

Figure 4:
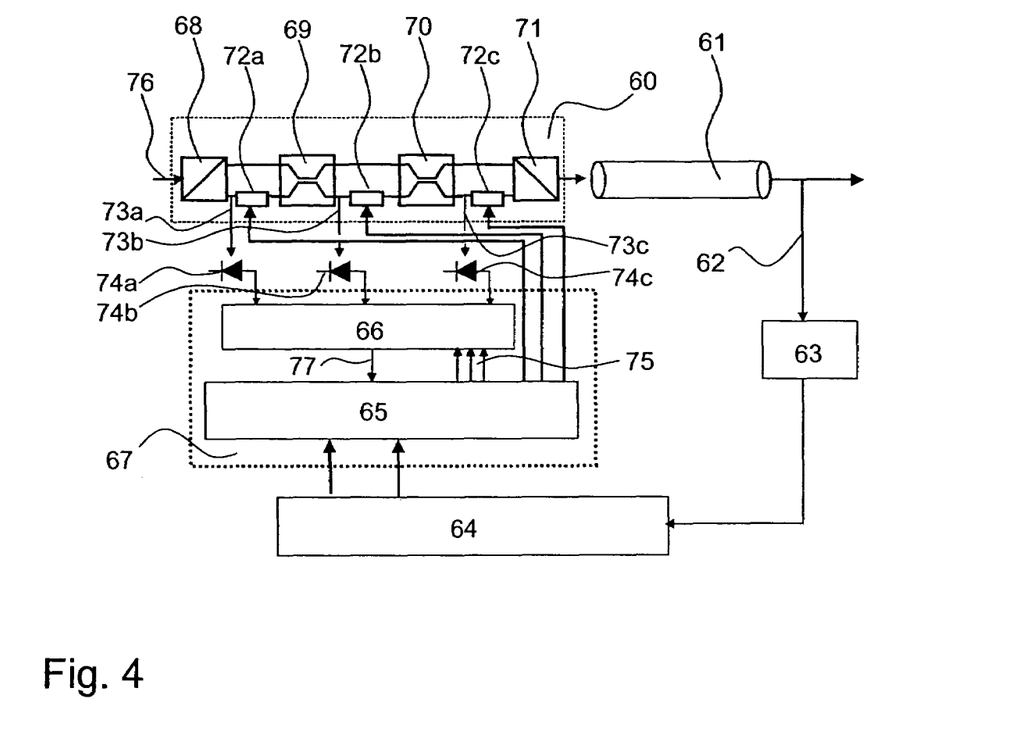
FIG. 4 shows a third embodiment of an inventive PMD controller device with a feedback loop and three feed-forward signal taps.

FIG. 4 shows another embodiment of the inventive PMD controller device. Its construction is very similar to the one described in FIG. 3, but has some inventive, additional features that help to reduce the number of dithering parameters. It comprises a PLC 60, a PMF 61, a feedback signal tap 62 with a feedback signal analyzer 63, a dithering controller unit 64 and a tuning unit 65, wherein the dithering controller unit 64 and the tuning unit 65 constitute an adaptation control unit, and a distortion analyzer unit 66. The tuning unit 65 and the distortion analyzer unit 66 are disposed on a common electronic control processor 67. The PLC 60 comprises a dispersion controller unit, namely with the elements of a PBS 68, 3 dB couplers 69, 70, a PBC 71, three tunable phaseshifters 72a, 72b, 72c controlled by the tuning unit 65, and connecting waveguides. Additionally, there are three feed-forward signal taps 73a-73c which run into photo diodes 74a-c measuring the relative average optical power levels of the tapped signals.

The PLC 60 is used both as a dispersion compensation unit and as part of a distortion analyzer, or more exactly of a polarization analyzer. The distortion analyzer unit 66 analyzes the tapped feed-forward signals taking into account the current status of the phaseshifters 72a-72c as messaged by the tuning unit 65 via signal lines 75. In turn, the resulting information about the state of polarization of the incoming optical light wave at an input waveguide 76 is messaged to the tuning unit 65 via a signal line 77. Note that the SOP of the incoming optical light wave cannot be reconstructed from the tapped feedback signal alone.

When the dithering controller unit 64 tries to optimize the feedback signal, it uses two dithering parameters, corresponding to the number of parameters necessary to describe the SOP of an optical light wave, for dithering. The tuning unit, having the polarization information about the incoming optical light wave, has a programming enabling it to turn the incoming dithering parameters into concrete tuning parameters for the three tunable phaseshifters 72a-72c in order to imprint the commanded change of polarization onto the optical light wave. Thus, the information about the state of polarization is used to reduce the effective number of dithering parameters and thus to accelerate the adaptation procedure.

The invention claimed is:

1. A polarization mode dispersion (PMD) controller device for controlling a state of polarization of an incoming optical light wave, in particular in a terabit optical network, the device comprising:

a dispersion compensation unit which receives the incoming optical light wave, splits the incoming optical light wave into a first optical signal and a second optical signal and outputs an equalized optical light wave, wherein the dispersion compensation unit comprises a plurality of compensation stages, wherein each compensation stage of the plurality of compensation stages comprises a feed-forward signal tap which taps the second optical signal and provides a feed-forward signal and a tunable phaseshifter which tunes the second optical signal, and wherein the plurality of compensation stages are connected in series with each connection comprising a first waveguide which receives the first optical signal and a second waveguide which receives the second optical signal;

a distortion analyzer unit which receives the feed-forward signal and outputs information about the incoming optical light wave based on the feed-forward signal; and an adaptation control unit which receives the information about the incoming optical light wave from the distortion analyzer unit and controls the dispersion compensation unit by tuning the tunable phaseshifter of each compensation stage based on said information.

2. PMD controller device according to claim 1, wherein only one feed-forward signal tap is provided which taps the incoming optical light wave and is inserted into a first compensation stage.

3. PMD controller device according to claim 1, wherein a plurality of feed-forward signal taps are provided which tap the second optical light signal and are each of the feed-forward signal taps of the plurality of feed-forward signal taps are inserted at different compensation stages.

4. The PMD controller device according to claim 1, wherein the distortion analyzer unit determines the state of polarization (SOP) of the incoming optical light wave as a function of the frequency of the incoming optical light wave based on the feed-forward signal provided from each compensation stage of the plurality of compensation stages.

5. The PMD controller device according to claim 1, wherein the distortion analyzer is suitable for analyzing a not polarization scrambled signal.

6. The PMD controller device according to claim 1, wherein at least one feed-forward signal tap comprises a wavelength demultiplexer unit, and the distortion analyzer unit receives demultiplexed signals provided by the at least one wavelength demultiplexer unit.

7. The PMD controller device according to claim 1, wherein the dispersion compensation unit further comprises a planar light wave circuit (PLC) comprising a polarization splitter at a signal input of the PLC, a plurality of 3 dB couplers and a polarization combiner at a signal output of the PLC, wherein the polarization splitter, the plurality of 3 dB couplers and the polarization combiner are connected in series, with each connection comprising the first waveguide and the second waveguide comprising the tunable phaseshifter.

8. The PMD controller device according to claim 1, wherein the PMD controller device further comprises a feedback signal tap which taps the equalized optical light wave, and wherein the adaptation control unit receives a feedback signal provided by the feedback signal tap.

9. A method of operating a polarization mode dispersion (PMD) controller device, the method comprising:
receiving an incoming optical light wave by the PMD controller device;
splitting the incoming optical light wave into a first optical signal and a second optical signal;
inputting the first optical signal and the second optical signal into a plurality of compensation stages, wherein each compensation stage comprises a tunable phaseshifter, wherein the second optical signal passes through the tunable phaseshifter, and wherein the plurality of compensation stages are connected in series and each connection comprises a first waveguide receiving the first optical signal and a second waveguide receiving the second optical signal;
outputting a plurality of feed-forward signals from the plurality of compensation stages;
tuning each tunable phaseshifter in each compensation stage of the plurality of the compensation stages, wherein the tuning comprises shifting a phase of the second optical signal at each compensation stage of the plurality of the compensation stages, and wherein the tuning is based on the plurality of feed-forward signals; and
outputting an equalized optical light wave from the PMD based on the tuning.

10. The method according to claim 9, further comprising determining a state of polarization (SOP) of the incoming optical light wave as a function of its frequency, and using the SOP information for controlling the plurality of compensation stages.

11. The method according to claim 10, wherein the controlling the compensation stages is based on a relation between signal distortion of the incoming light wave and the tuning.

12. The method according to claim 10, wherein the controlling of the compensation stages is performed continuously.

13. A computer-readable medium storing a program for performing a method of operating a polarization mode dispersion (PMD) controller device, the method comprising:
receiving an incoming optical light wave by the PMD controller device;
splitting the incoming optical light wave into a first optical signal and a second optical signal;
inputting the first optical signal and the second optical signal into a plurality of compensation stages, wherein each compensation stage comprises a tunable phaseshifter, wherein the second optical signal passes through the tunable phaseshifter, and wherein the plurality of compensation stages are connected in series and each connection comprises a first waveguide receiving the first optical signal and a second waveguide receiving the second optical signal;
outputting a plurality of feed-forward signals from the plurality of compensation stages;
tuning each tunable phaseshifter in each compensation stage of the plurality of the compensation stages, wherein the tuning comprises shifting a phase of the second optical signal at each compensation stage of the plurality of the compensation stages, and wherein the tuning is based on each feed-forward signal output from each compensation stage of the plurality of compensation stages; and
outputting an equalized optical light wave from the PMD based on the tuning.

14. The method according to claim 9 further comprising:
providing a feedback signal from the equalized optical light wave; and
optimizing the feedback signal by dithering a number N of parameters smaller than an amount P of tuning parameters, wherein the tuning is based on the tuning parameters and the plurality of feed-forward signals.

15. The PMD controller device according to claim 1, further comprising a feedback signal tap which taps the equalized optical light wave and outputs a feedback signal, wherein the adaptation control unit controls the dispersion compensation unit by tuning the tunable phaseshifter of each compensation stage based on the information output from the distortion analyzer unit and the feedback signal.

* * * * *